US012583466B2

(12) United States Patent
Peretz et al.

(10) Patent No.: US 12,583,466 B2
(45) Date of Patent: Mar. 24, 2026

(54) VEHICLE CONTROL MODULES INCLUDING CONTAINERIZED ORCHESTRATION AND RESOURCE MANAGEMENT FOR MIXED CRITICALITY SYSTEMS

(71) Applicant: GM GLOBAL TECHNOLOGY OPERATIONS LLC, Detroit, MI (US)

(72) Inventors: Tomer Peretz, Gan Yavne (IL); Ofer Rosenberg, Ramot Menashe (IL); Boris Tsukerman, Rishon le Zion (IL); Moshe Anscel, Tel Mond (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 445 days.

(21) Appl. No.: 18/121,725

(22) Filed: Mar. 15, 2023

(65) Prior Publication Data

US 2024/0308533 A1     Sep. 19, 2024

(51) Int. Cl.
| | |
|---|---|
| *B60W 50/029* | (2012.01) |
| *B60W 50/035* | (2012.01) |
| *B60W 50/06* | (2006.01) |
| *B60W 60/00* | (2020.01) |

(52) U.S. Cl.
CPC ........ *B60W 50/029* (2013.01); *B60W 50/035* (2013.01); *B60W 50/06* (2013.01); *B60W 60/00186* (2020.02); *B60W 2050/0295* (2013.01); *B60W 2710/18* (2013.01); *B60W 2710/30* (2013.01)

(58) Field of Classification Search
CPC .. B60W 50/029; B60W 50/035; B60W 50/06; B60W 60/00186; B60W 2050/0295; B60W 2710/18; B60W 2710/30; B60W 2050/0006

See application file for complete search history.

(56) References Cited

U.S. PATENT DOCUMENTS

| | | | | |
|---|---|---|---|---|
| 8,103,769 | B1 * | 1/2012 | Weiser | H04L 43/0876 709/225 |
| 11,153,313 | B2 * | 10/2021 | Cholas | H04N 21/2541 |
| 11,995,466 | B1 * | 5/2024 | Srikanta | H04L 67/02 |
| 2004/0153552 | A1 * | 8/2004 | Trossen | H04L 63/10 709/228 |

(Continued)

*Primary Examiner* — Thomas C Lee

(57) ABSTRACT

A vehicle control method includes defining a set of multiple workloads, each workload including a workload descriptor and at least one containerized image configured to execute at least one vehicle control process, the workload descriptor defining a safety level of the workload, one or more vehicle system resources used by the least one containerized image of the workload, and a vehicle system location for executing the containerized images. The method includes allocating vehicle system resources to each workload according to the workload descriptors, wherein the vehicle system resources include at least one of a central processor utilization, a graphics processor utilization, a memory size, an artificial intelligence accelerator, or a video codec, executing the vehicle control processes of the containerized images of the multiple workloads, and in response to a vehicle system resource conflict, assigning higher priority resource access to workloads having a critical safety level.

20 Claims, 8 Drawing Sheets

(56)　　　　　References Cited

U.S. PATENT DOCUMENTS

| | | | |
|---|---|---|---|
| 2008/0098401 A1* | 4/2008 | Weatherhead | G06F 9/526 |
| | | | 718/104 |
| 2010/0306394 A1* | 12/2010 | Brown | H04L 63/0492 |
| | | | 709/229 |
| 2011/0066344 A1* | 3/2011 | Niwa | B60W 10/184 |
| | | | 701/70 |
| 2021/0303328 A1* | 9/2021 | Soppin | G06F 9/5005 |
| 2022/0028185 A1* | 1/2022 | Wang | B60W 40/09 |
| 2022/0219711 A1* | 7/2022 | Ohashi | B60W 60/001 |
| 2024/0192940 A1* | 6/2024 | Mesde | G06F 8/60 |

* cited by examiner

VEHICLE CONTROL MODULES INCLUDING CONTAINERIZED ORCHESTRATION AND RESOURCE MANAGEMENT FOR MIXED CRITICALITY SYSTEMS

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle control systems including containerized orchestration and resource management for mixed criticality systems.

Vehicle control modules may implement systems that include both safety critical applications and non-safety critical applications. It is desirable that the operations of the non-safety critical applications do not interfere with execution of the safety critical applications. Some vehicle control modules may avoid interference by separating safety and non-safety critical applications to different operation systems, or by analyzing and validating the system as a whole (which creates a very complex system). These methods may require long integration and validation cycles, which result in very long software delivery time periods and non-optimal use of system resources. In addition, recovery of a process failure in these methods is very complicated.

SUMMARY

A vehicle control method includes defining a set of multiple workloads, each workload including a workload descriptor and at least one containerized image configured to execute at least one vehicle control process, the workload descriptor defining a safety level of the workload, a recovery mechanism for the workload, one or more vehicle system resources used by the at least one containerized image of the workload, and a vehicle system location for executing the containerized images of the workload. The method includes allocating vehicle system resources to each workload according to the workload descriptors, wherein the vehicle system resources include at least one of a central processor utilization, a graphics processor utilization, a memory size, an artificial intelligence accelerator, or a video codec, executing the vehicle control processes of the containerized images of the multiple workloads, and in response to a vehicle system resource conflict, assigning higher priority resource access to workloads having a critical safety level and assigning lower priority resource access to workloads having a non-critical safety level.

In other features, the method includes assigning a first one of the vehicle system resources to a first one of the multiple workloads, and assigning a second one of the vehicle system resources to a second one of the multiple workloads, wherein the second one of the multiple workloads is inhibited from accessing the first one of the vehicle system resources.

In other features, the method includes monitoring resource usage of each workload, comparing the monitored resource usage of each workload to a threshold resource usage value associated with the workload, and in response to the monitored resource usage of one of the multiple workloads exceeding the threshold resource usage value associated with the workload, restricting the workload from accessing at least one of the vehicle system resources.

In other features, monitoring resource usage of each workload is performed by an orchestrator module or a separate monitor module used by the orchestrator module, and the orchestrator module is configured to load the workload descriptor of each of the multiple workloads to determine the threshold resource usage value associated with each workload.

In other features, the method includes inhibiting access to a vehicle system resource by the multiple workloads, receiving a request from one of the multiple workloads to access the vehicle system resource, comparing the one of the one of the multiple workloads to a resource permission list, allowing the one of the multiple workloads to utilize the vehicle system resource in response an indication in the resource permission list that the one of the multiple workloads is permitted to utilize the vehicle system resource, and denying the one of the multiple workloads from utilizing the vehicle system resource in response an indication in the resource permission list that the one of the multiple workloads is not permitted to utilize the vehicle system resource.

In other features, each containerized image is configured to execute as at least one of a file, a binary format or a memory buffer.

In other features, each containerized image includes a configuration file configured to specify an order of loading and unloading each process component associated with the containerized image.

In other features, the method includes monitoring operation of each workload for an error condition, and in response to detecting the error condition for one of the multiple workloads, determining the safety level of the one of the multiple workloads having the error condition, automatically shutting down one or more vehicle control processes of the one of the multiple workloads having the error condition, in response to the safety level being a non-critical safety level, and requesting a managed shutdown of the one or more vehicle control processes of the one of the multiple workloads having the error condition in response to the safety level being a critical safety level.

In other features, the method includes, in response to the safety level being a non-critical safety level, automatically restarting the one or more vehicle control processes of the one of the multiple workloads having the error condition, and in response to the safety level being a critical safety level, requesting a managed restart of the one or more vehicle control processes of the one of the multiple workloads having the error condition.

In other features, the method includes receiving, by an orchestrator module, the set of multiple workloads, and for each containerized image in the set of multiple workloads, loading the containerized image at a defined location when the workload descriptor associated with the containerized image specifies a loading location for the containerized image, and when the workload descriptor associated with the containerized image does not specify a loading location for the containerized image, identifying a system resource location where vehicle system resources are available and loading the containerized image at the system resource location.

In other features, one of the multiple workloads is an autonomous driving workload, and each vehicle control process associated with a containerized image of the autonomous driving workload is configured to control at least one autonomous driving feature of a vehicle.

In other features, at least one of the multiple workloads has a critical safety level and includes a vehicle braking control process, and at least one of the multiple workloads has a non-critical safety level and includes at least one of an infotainment system control process or a heating, air-conditioning and ventilation (HVAC) system control process.

In other features, at least one of the multiple workloads includes two containerized images that are configured to execute on different operating systems.

In other features, a hypervisor module is configured to control operation of the different operating systems via a same system-on-chip implementation.

A vehicle control system includes a motor configured to drive wheels of a vehicle, a braking module configured to inhibit rotation of the wheels of the vehicle, and a vehicle control module configured to define a set of multiple workloads, each workload including a workload descriptor and at least one containerized image configured to execute a vehicle control process, the workload descriptor defining a safety level of the workload, a recovery mechanism for the workload, one or more vehicle system resources used by the at least one containerized image of the workload, and a vehicle system location for executing the vehicle control process of the containerized image of the workload. The vehicle control module is configured to allocate vehicle system resources to each workload according to the workload descriptors, wherein the vehicle system resources include at least one of a central processor utilization, a graphics processor utilization, a memory size, an artificial intelligence accelerator, or a video codec, execute the vehicle control processes of the containerized images of the multiple workloads, and in response to a vehicle system resource conflict, assign higher priority resource access to workloads having a critical safety level and assign lower priority resource access to workloads having a non-critical safety level.

In other features, the vehicle control module is configured to assign a first one of the vehicle system resources to a first one of the multiple workloads, and assign a second one of the vehicle system resources to a second one of the multiple workloads, wherein the second one of the multiple workloads is inhibited from accessing the first one of the vehicle system resources.

In other features, the vehicle control module is configured to monitor resource usage of each workload, compare the monitored resource usage of each workload to a threshold resource usage value associated with the workload, and in response to the monitored resource usage of one of the multiple workloads exceeding the threshold resource usage value associated with the workload, restricting the workload from accessing at least one of the vehicle system resources.

In other features, the system includes an orchestrator module configured to monitor usage of each workload, and load the workload descriptor of each of the multiple workloads to determine the threshold resource usage value associated with each workload.

In other features, the vehicle control module is configured to inhibit access to at least one of the vehicle system resources by the multiple workloads, receive a request from one of the multiple workloads to access the vehicle system resource, compare the one of the one of the multiple workloads to a resource permission list, allow the one of the multiple workloads to utilize the vehicle system resource in response an indication in the resource permission list that the one of the multiple workloads is permitted to utilize the vehicle system resource, and deny the one of the multiple workloads from utilizing the vehicle system resource in response an indication in the resource permission list that the one of the multiple workloads is not permitted to utilize the vehicle system resource.

In other features, each containerized image is configured to execute as at least one of a file, a binary format or a memory buffer.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
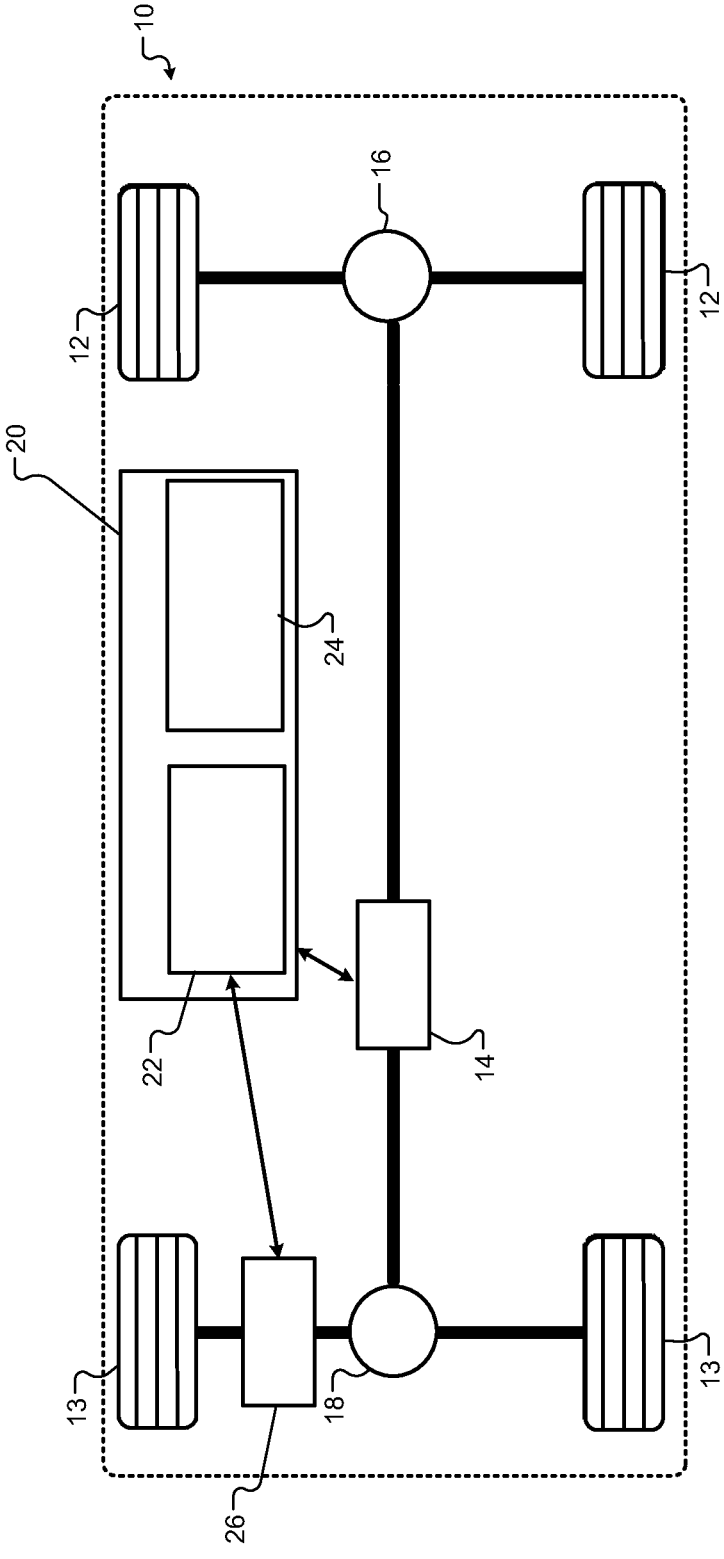
FIG. 1 is a functional block diagram of an example embodiment of a vehicle including a vehicle control module having safety critical and non-safety critical system control modules.

In some example embodiments, a vehicle control module includes a software architecture configured to deploy and execute mixed criticality software on embedded systems. The architecture allows flexible software development and deployment, fast delivery of software features, and isolated recovery between features. In various implementations, the vehicle control module may provide a mechanism to deploy feature partitioned software, and protect shared system resources while maintaining safety requirements. As used herein, "vehicle" may refer to any suitable system where movement is at least partially electronically controlled, and the control includes at least some safety precautions, such as an automobile driven by a user (or autonomously), moveable robotics systems, drones, etc.

Some example embodiments utilize software containers, workloads and dedicated orchestration techniques, in order to avoid interference between safety critical applications and non-safety critical applications running on, e.g., a same operating system, and to avoid interference between two safety critical applications running on the same operating system. Vehicle control applications may be characterized as safety critical applications or non-safety critical applications (or a scale of levels of safety importance), based on any suitable criteria. For example, vehicle control applications may correspond to automotive safety integrity levels (ASILs), including quality management (QM) ratings indicating that all assessed risks are tolerable and safety assurance controls may be unnecessary.

Some example methods may include novel ways to deploy, test, validate and recover software in a way that reduces or eliminates resource dependency between safety critical applications and non-safety critical applications. Various implementations may leverage and modify containers and orchestration techniques to support a mixed criticality software system. Those techniques may facilitate isolated recovery, and ensure availability of resources prior to execution.

Some example embodiments may provide one or more advantages, including a faster time to market for software features, by reducing system complexity and reducing validation efforts. A vehicle control module may provide higher availability of software features by protecting against some cross application failures, which may allow for maintaining one functional feature even when another feature fails. A vehicle control module may be configured to maintain applications separately, and not as a monolithic source code.

When an application is not in use, the vehicle control module may allow resources to be used by other applications. For example, vehicle system resources that are assigned to a specified application, or reserved by the specified application, may be made available for use by other applications when the specified application is not using the system resources. This may allow for high utilization of vehicle system resources, where the resources can be shared in a finer grained manner. Reducing complexity and dependencies between features may allow for higher levels of safety, and simplify safety validation.

Referring now to FIG. 1, a vehicle 10 includes front wheels 12 and rear wheels 13. In FIG. 1, a drive unit 14 selectively outputs torque to the front wheels 12 and/or the rear wheels 13 via drive lines 16, 18, respectively. The vehicle 10 may include different types of drive units. For example, the vehicle may be an electric vehicle such as a battery electric vehicle (BEV), a hybrid vehicle, or a fuel cell vehicle, a vehicle including an internal combustion engine (ICE), or other type of vehicle.

Some examples of the drive unit 14 may include any suitable electric motor, a power inverter, and a motor controller configured to control power switches within the power inverter to adjust the motor speed and torque during propulsion and/or regeneration. A battery system provides power to or receives power from the electric motor of the drive unit 14 via the power inverter during propulsion or regeneration.

While the vehicle 10 includes one drive unit 14 in FIG. 1, the vehicle 10 may have other configurations. For example, two separate drive units may drive the front wheels 12 and the rear wheels 13, one or more individual drive units may drive individual wheels, etc. As can be appreciated, other vehicle configurations and/or drive units can be used.

The vehicle control module 20 may be configured to control operation of one or more vehicle components, such as the drive unit 14 (e.g., by commanding torque settings of an electric motor of the drive unit 14). The vehicle control module 20 may receive inputs for controlling components of the vehicle, such as signals received from a steering wheel, an acceleration paddle, etc. The vehicle control module 20 may monitor telematics of the vehicle for safety purposes, such as vehicle speed, vehicle location, vehicle braking and acceleration, etc.

The vehicle control module 20 may receive signals from any suitable components for monitoring one or more aspects of the vehicle, such as one or more sensors, one or more cameras, one or more microphones, etc. The vehicle control module 20 may communicate with another device via a wireless communication interface, which may include one or more wireless antennas for transmitting and/or receiving wireless communication signals. For example, the wireless communication interface may communicate via any suitable wireless communication protocols, including but not limited to vehicle to vehicle (V2V) communication, vehicle to load (V2L) communication, Wi-Fi communication, wireless area network (WAN) communication, cellular communication, personal area network (PAN) communication, short-range wireless communication (e.g., Bluetooth), etc. The wireless communication interface may communicate with a remote computing device over one or more wireless and/or wired networks.

As shown in FIG. 1, the vehicle control module 20 may include one or more safety critical system control modules 22. For example, a safety critical system control module may include an application responsible for controlling one or more features of the vehicle that are critical for safe operation of the vehicle, such as a braking system.

The vehicle control module 20 may include one or more non-safety critical system control modules 24. For example, a non-safety critical system control module may include an application responsible for controlling one or more features of the vehicle that are not critical for safe operation of the vehicle, such as an infotainment system, a backup camera, a heating, air-conditioning and ventilation (HVAC) system, etc.

Figure 2A:
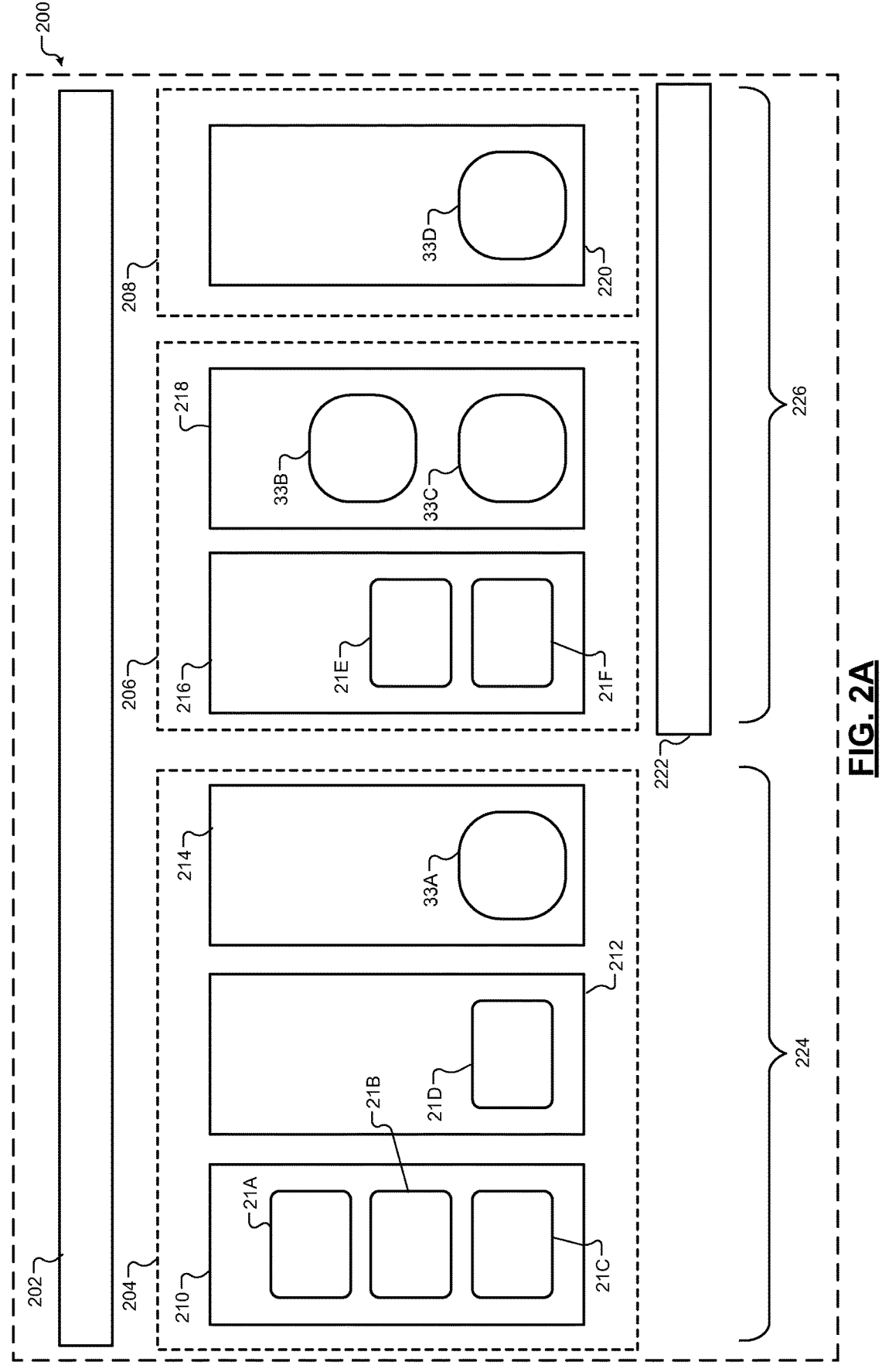
FIG. 2A is a block diagram of a vehicle control module 200 including multiple containerized images, according to an example embodiment.

FIG. 2A is a block diagram of a vehicle control module 200 including multiple containerized images, according to an example embodiment. As shown in FIG. 2A, the vehicle control module includes an orchestrator module 202, a first operating system 204, a second operating system 206, and a third operating system 208. For example, the vehicle control module 200 may be configured to implement multiple operating systems, which may each operate one or more containerized images. In various implementations, not all processes running on an operating system may be containerized.

In the example embodiment of FIG. 2A, the first operating system includes an A1 container 210, an A2 container 212, and a B1 container 214. The second operating system 206 includes an A3 container 216, and a B2 container 218. The third operating system 208 includes a B3 container 220.

A user may define a collection of software components, such as software applications, software services, software libraries, etc., and the software components may include separable features. In various implementations, the software components may be packed into a binary format, such as a file or memory buffer. For example, software container modules, such as those provided by Docker, Podman, LXC, etc., may be used to contain or execute various software components. The software container modules may be referred to as containerized images.

The software components may be packed into one or more containerized images, which may be specified according to user requirements, system requirements. As an example, in some embedded systems a separated containerized image may be used for each operating system and/or each device. Each containerized image may include a configuration file which defines an order of loading and unloading of the software components inside the containerized image. A runtime of each software component feature may be implemented, placed, stored, etc. in a containerized image.

A "workload" may refer to a package containing one or more containerized images and a workload descriptor, which may be delivered, stored, implemented, etc. as a file or memory buffer. For example, all software modules, components, etc. that are used for autonomous driving may be included in a defied workload descriptor. In various implementations, a software component may include a collection of one or more containerized images, and a workload may include a collection of software components.

Figure 2B:
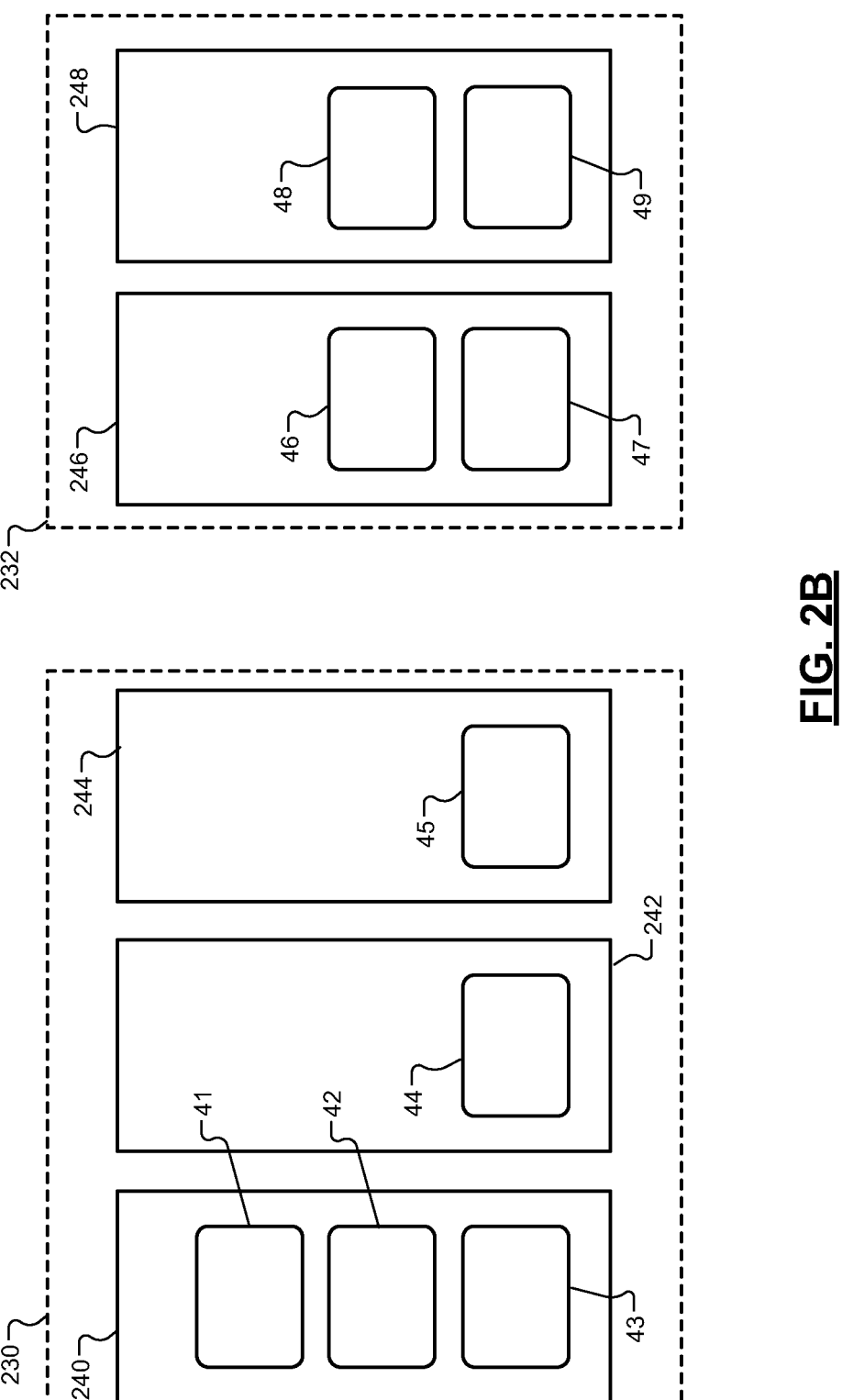
FIG. 2B is a block diagram illustrating an example composition of multiple workloads, software components and containerized images, according to an example embodiment.

FIG. 2B illustrates an example embodiment where a first workload 230 includes a first software component 240, a second software component 242, and a third software component 244. A second workload 232 includes a fourth software component 246 and a fifth software component 248.

As shown in the example of FIG. 2B, the first software component 240 includes a first containerized image 41, a second containerized image 42, and a third containerized image 43. The second software component 242 includes a fourth containerized image 44. The third software component 244 includes a fifth containerized image 45. The fourth software component 246 includes a sixth containerized image 46 and a seventh containerized image 47. The fifth software component 248 includes an eighth containerized image 48, and a ninth containerized image 49.

The workload descriptor may define vehicle resources that are used by the software components within the workload, such as resources used by an autonomous driving module (e.g., one or more cameras, one or more CPUs, etc.). The workload descriptor may define the resources as assigned to the software components within the workload, such that other modules of the vehicle are not allowed to use the assigned resources.

In the example of FIG. 2A, a first workload may include the A1 container 210 and the A2 container 212 of the first operating system 204, and the A3 container 216 of the second operating system 206. A second workload may include the B1 container 214 of the first operating system 204, the B2 container 218 of the second operating system 206, and the B3 container 220 of the third operating system 208. In various implementations, workloads may include multiple containers, which may be spread across one or more different operating systems.

The vehicle control module 200 includes an orchestrator module 202. The orchestrator module 202 is configured to manage resource sharing between different workloads and/or containers. For example, as shown in FIG. 2A, in the first operating system 204, the A1 container 210 includes three safety critical processes 21A, 21B and 21C. The A2 container 212 includes a safety critical process 21D, and the B1 container 214 includes a non-safety critical process 33A.

In the second operating system 206, the A3 container 216 includes a safety critical process 21E and another safety critical process 21F, and the B2 container 218 includes a non-safety critical process 33B and another non-critical safety process 33C. In the third operating system 208, the B3 container 220 includes a non-safety critical process 33D.

Processes may be identified as safety critical or non-safety critical using any suitable criteria, such as user specified safety levels, safety levels defined by industry standards, etc. For example, safety critical processes may control features that are needed for safe control of the vehicle, such as braking, acceleration and steering. Non-safety critical processes may include control features that are less impactful on safe operation of the vehicle, such as an infotainment system, etc.

As described herein, the vehicle control module 200 may be considered as controlling a mixed criticality system. For example, both safety and non-safety applications may be executed on a same vehicle control module (which may include an electronic control unit (ECU), etc.). If two processes are attempting to use a same CPU, the safety application may receive less processing from the CPU, potentially leading to dangerous driving situations. The control module 200 may be configured to ensure that the safety application receives at least a minimum amount of resources to meet safety requirements.

The orchestration module 202 may be configured to manage resource allocation to different processes with the different containers, based on safety or non-safety ratings of the different processes, and a type of resource management scheme used by the vehicle control module 200. For example, resource separation may be used to block resources from overuse, resource monitoring may be used to detect overuse of a resource and then restrict a violator after the overuse is detected, and a resource manager scheme may include each process having to submit a request before being approved to use a resource.

In the resource separation scheme, the orchestrator module 202 may not play much of a role if resources are already separated to different processes, containers, etc. For example, each application may have a specific CPU core, a specific memory, a specified device, a specified operating system, etc., where the application is allowed to run, to avoid conflicting with other applications using other resources.

In the resource monitor scheme, the orchestrator module 202 may be configured to monitor usage of resources by different processes and containers, and intervene to restrict usage of a resource by a violator if a process, containerized image or defined workload uses more of a resource than has been assigned to a process or container. The vehicle control module 200 may take a response time delay into account, such as a response time delay between the orchestrator module 202 detecting overuse of a resource and the orchestrator module 202 acting to restrict overuse of the resource by the violator. For example, the vehicle control module 200 may set overuse detection thresholds at a slightly lower level such that the overuse will not exceed permissible levels during the delay between the orchestrator module 202 detecting overuse of the resource and the orchestrator module 202 acting to restrict overuse of the resource by the violator.

In the resource management scheme, the orchestrator module 202 (and/or other modules of a vehicle control system) may require processes to submit a resource usage request, before the processes can access the resource. For example, a process may not be able to access a vehicle camera directly, and may have to request use of the vehicle camera before the process is allowed to use it.

The vehicle control module may include a hypervisor module 222. The hypervisor module 222 may be configured to run on top of a CPU to allow for implementation of multiple operating systems that are separate from one another. For example, the hypervisor module 222 may facilitate the second operating system 206 and the third operating system 208 running on a same CPU associated with the vehicle control module 200. In some example embodiments, the hypervisor module 222 may run virtual machines for each operating system.

Portions of the vehicle control module 200 may be implemented across one or more system-on-chip (SOC) arrangements. For example, the first operating system 204 may be implemented on a first system-on-chip 224. A second system-on-chip 226 may include the second operating system 206, the third operating system 208, and the hypervisor module 222 (which may be configured to facilitate both the second operating system 206 and the third operating system 208 operating separately on the same system-on-chip 226).

Figure 3:
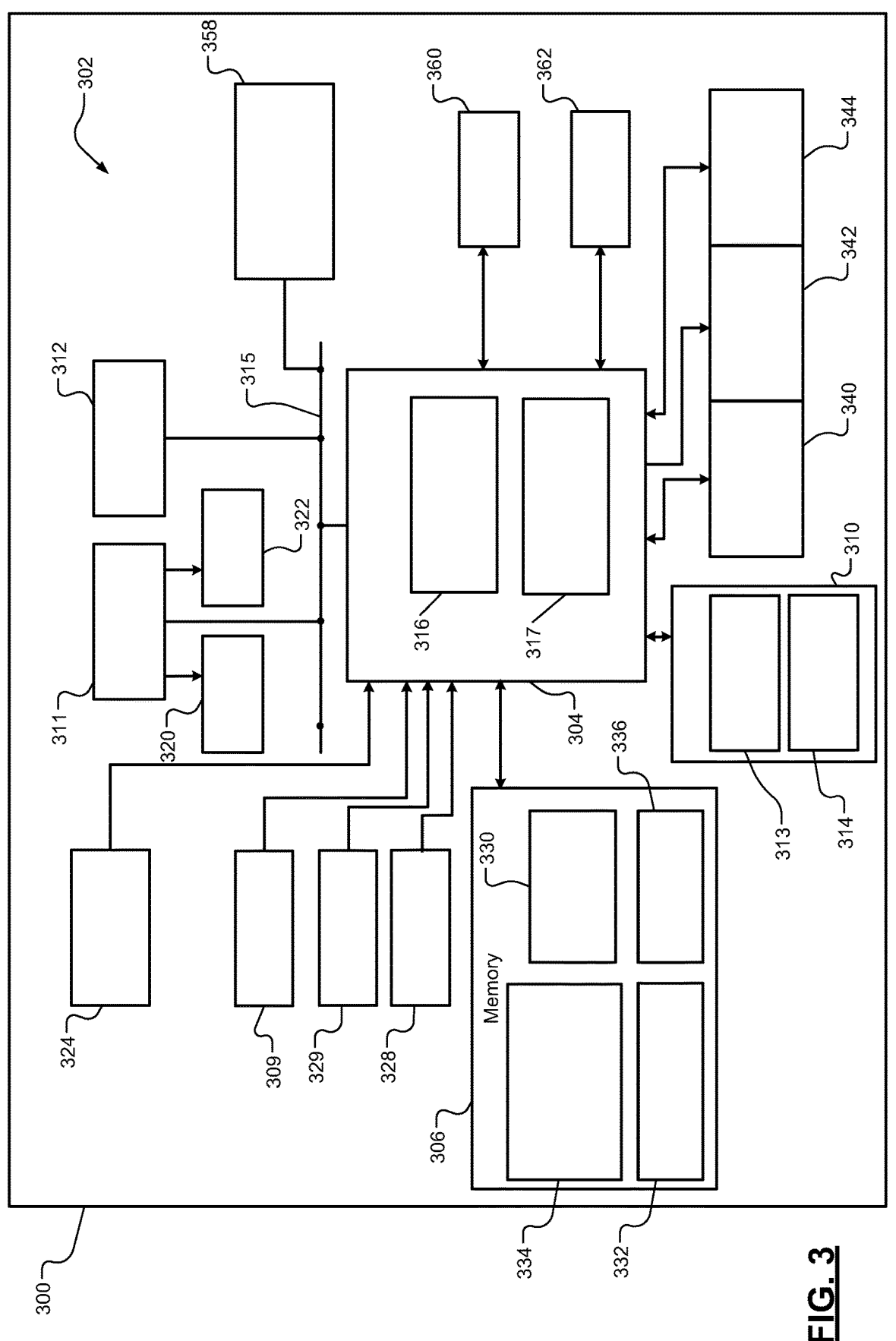
FIG. 3 is a functional block diagram of a vehicle including a vehicle control module configured to implement a workload management module and a container management module.

FIG. 3 is a functional block diagram of a vehicle 300 including a vehicle control module 304 configured to implement a workload management module 316, and a container management module 317. The vehicle 300 may be a non-autonomous, partially autonomous or fully autonomous vehicle. The vehicle 300 may be a non-electric, hybrid or fully electric vehicle. The vehicle 300 includes the vehicle control module 304, a memory 306, and vehicle other sensors 309. The vehicle 300 may further include a power source 310, an infotainment module 311 and other control modules 312. The power source 310 includes one or more battery packs (one battery pack 313 is shown) and a control circuit 314.

The vehicle sensors 309 may include temperature sensors, cameras, Lidar sensor(s), radar sensor(s), accelerometers, a vehicle velocity sensor, microphones, and/or other sensors. The modules 304, 311, 312 may communicate with each other and have access to the memory 306 via one or more buses and/or network interfaces 315. The network interfaces 315 may include a controller area network (CAN) bus, a local interconnect network (LIN) bus, Ethernet, PCIe, an auto network communication protocol bus, and/or other network bus.

The vehicle control module 304 controls operation of vehicle systems. The vehicle control module 304 may include a workload management module 316 and a container management module 317, as well as other modules. The workload management module 316 may be configured to define "workload" packages containing one or more containerized images and a workload descriptor, which may be delivered, stored, implemented, etc. as a file or memory buffer. For example, all software modules, components, etc. that are used for a particular control function of the vehicle 300 may be included in a defied workload descriptor. The workload descriptor may define vehicle resources that are used by the software components within the workload (e.g., one or more cameras, one or more CPUs, etc.). The container management module 317 may be configured to implement the defined workloads across one or more containerized images, such as the A1 container 210, an A2 container 212, and a B1 container 214. The second operating system 206 includes an A3 container 216, and a B2 container 218. The third operating system 208 includes a B3 container 220.

The vehicle 300 may further include a display 320, an audio system 322, and one or more transceivers 324. The display 320 and/or audio system 322 may be implemented along with the infotainment module 311 as part of an infotainment system.

The vehicle 300 may further include a global positioning system (GPS) receiver 328 and a MAP module 329. The GPS receiver 328 may provide vehicle velocity and/or direction (or heading) of the vehicle and/or global clock timing information. The GPS receiver 328 may also provide vehicle location information. The MAP module 329 provides map information. The map information may include traffic control objects, routes being traveled, and/or routes to be traveled between starting locations (or origins) and destinations. The GPS receiver 328 and/or the MAP module 329 may be used to determine location of objects and position of the vehicle 300 relative to the objects. This information may also be used to determine heading information of the vehicle 300, and a relative speed of the vehicle 300.

The memory 306 may store sensor data 330, vehicle parameters 332, safety critical and non-safety critical applications 334 and other applications 336. The safety critical and non-safety critical applications 334 and other applications 336 may be executed by the modules 304, 311, 312, etc. Although the memory 306 and the vehicle control module 304 are shown as separate devices, the memory 306 and the vehicle control module 304 may be implemented as a single device. In various implementations, inside the vehicle control module, each system-on-chip may have its own memory.

The vehicle control module 304 may control operation of an engine 340 (e.g., an electric engine, a hybrid engine, or an internal combustion engine), a converter/generator 342, a transmission 344, a brake control system 358, electric motors 360 and/or a steering system 362 according to parameters set by the modules 303, 304, 311, 312, 318. The vehicle control module 304 may set some of the vehicle parameters 332 based on signals received from the vehicle sensors 309.

The vehicle control module 304 may receive power from the power source 310, which may be provided to the engine 340, the converter/generator 342, the transmission 344, the brake control system 358, the electric motors 360 and/or the steering system 362, etc. Some of the vehicle control operations may include enabling fuel and spark of the engine 340, starting and running the electric motors 360, powering any of the systems 302, 358, 362, and/or performing other operations as are further described herein.

The engine 340, the converter/generator 342, the transmission 344, the brake control system 358, the electric motors 360 and/or the steering system 362 may include actuators controlled by the vehicle control module 304 to, for example, adjust fuel, spark, air flow, steering wheel angle, throttle position, pedal position, etc. This control may be based on the outputs of the vehicle sensors 309, the GPS receiver 328, the MAP module 329 and the above-stated data and information stored in the memory 306. The vehicle control module 304 may determine various parameters including a vehicle speed, an engine speed, an engine torque, a gear state, an accelerometer position, a brake pedal position, an amount of regenerative (charge) power, and/or other information.

Figure 4:
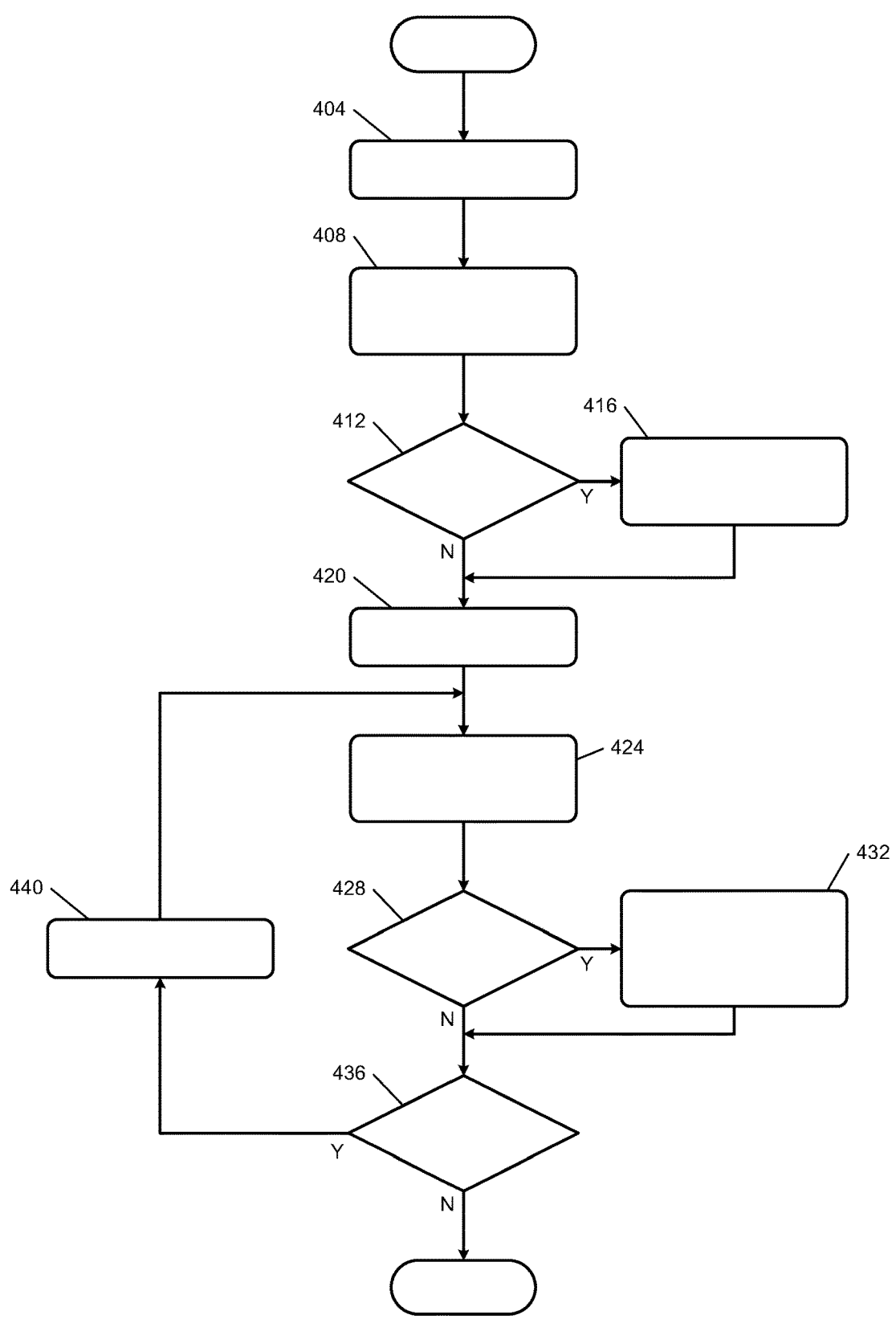
FIG. 4 is a flowchart illustrating an example process for defining workloads including containerized images for safety critical and non-safety critical vehicle control processes.

FIG. 4 is a flowchart illustrating an example process for defining workloads (which may include creating a workload descriptor), including containerized images for safety critical and non-safety critical vehicle control processes. A workload descriptor may include a description of the workload, any may include example fields such as safety level of the workload (e.g., safety critical, or non-safety critical), an allowed recovery mechanism for recovering processes of the workload in response to an error or abnormal condition (e.g., automatic recovery, supervised recovery, other recovery types), and dependent workloads (e.g., other workloads which may be needed in the vehicle control system for the present workload to function properly).

For each containerized image of a workload, the workload description may define resources used by the containerized image. Some example vehicle system resources that may be specified for use by a containerized image are central processor (CPU) utilization, graphics processor (GPU) utilization, memory size, specialized accelerators (such as an artificial intelligence accelerator, or a video codec), camera resources, etc.

The workload descriptor may specify a system location (such as a specific vehicle system device, a specific operating system, etc.), where a containerized image may be executed. For example, the workload descriptor may specify a location in a vehicle control system where a binary image may be executed. In some example embodiments it may be required for the workload descriptor to specify a location for all safety critical rated containerized images, where it is optional to specify a location for non-safety critical rated containerized images.

Referring to FIG. 4, at 404 a vehicle control module may be configured to obtain a workload safety level, such as critical safety rated or non-critical safety rated. At 408, the vehicle control module is configured to identify an allowed recovery mechanism for the workload. For example, in some implementations a non-safety critical workload may be automatically shut down and restarted safely by, e.g., an orchestration module of the vehicle control module, while safety critical workloads may use a supervised recovery process where another component controls recovery of the processes of the safety critical workload to avoid vehicle safety issues.

At 412, control determines whether there are any dependent workloads present. If so, control loads the dependent workloads at 416 (or otherwise links or associates the dependent workloads). Control then selects a first containerized image at 420.

At 424, the vehicle control module is configured to specify resources required by the containerized image. Control then determines at 428 whether the workload is a safety rated workload or a non-critical safety rated workload. If the workload is a safety critical related workload, the vehicle control modules is configured to verify a system location and resources for executing a binary image associated with the workload, at 432.

At 436, the vehicle control module is configured to determine whether any additional containerized images are remaining. If so, control selects the next containerized image at 440, and returns to 424 to specify resources required by the selected next containerized image. Once all containerized images have been processed at 436, the process ends.

Figure 5:
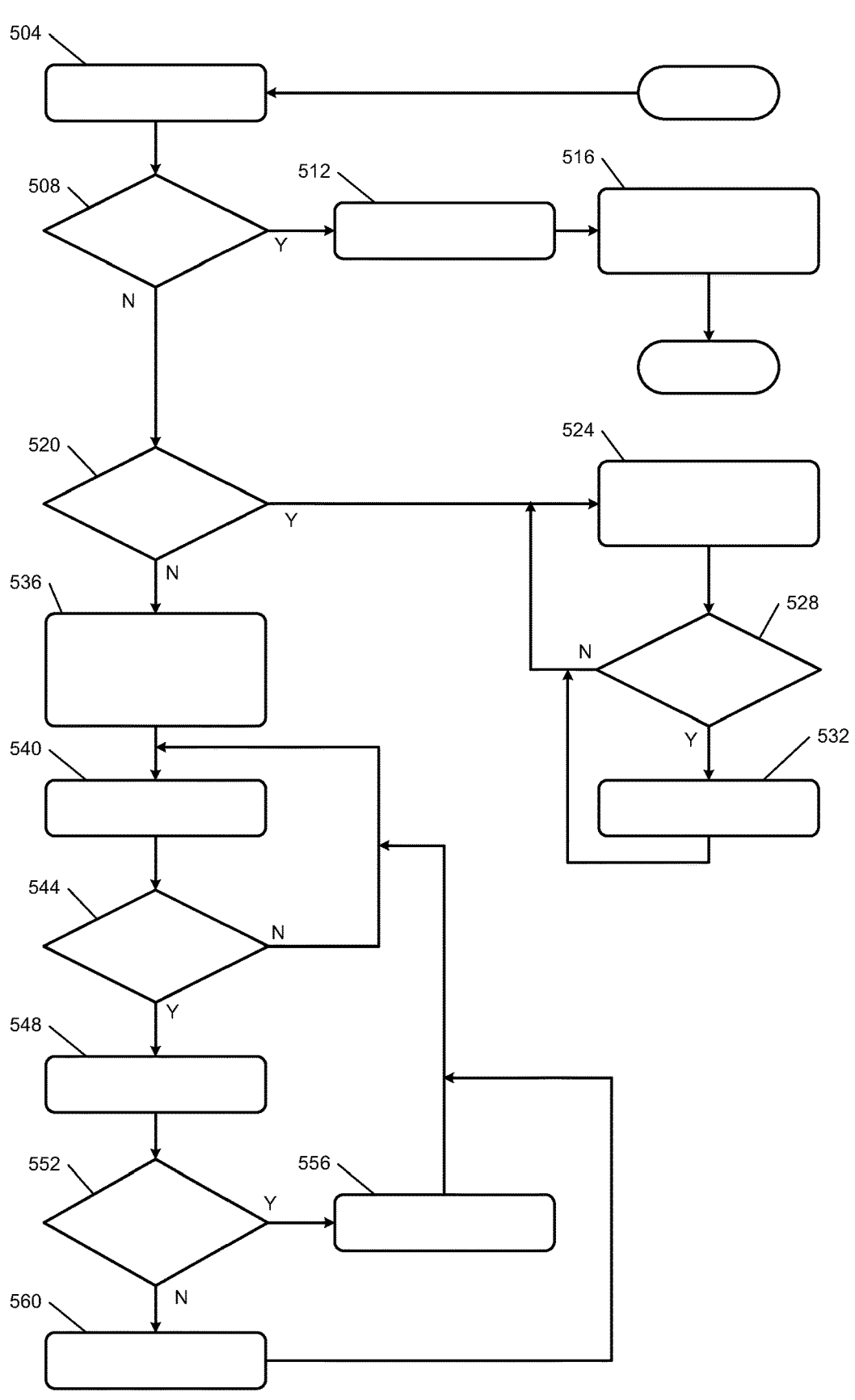
FIG. 5 is a flowchart illustrating an example process for executing a workload including containerized images while managing vehicle system resources.

FIG. 5 is a flowchart illustrating an example process for executing a workload including containerized images while managing vehicle system resources. In some example embodiments, a method for executing a workload with required resources may use one or more mechanisms to the resource usage by containerized images.

The resource protection mechanism may include resource separation. Vehicle system resources may be divided between the workloads, to ensure that each workload is inhibited or prevented from using a resource of another workload. This mechanism may also ensure that there are no dependencies or interference between portions of a same resource. For example, a resource separation protection mechanism may protect a resource on its own, such that no special action needs to be taken by other components of the vehicle control module (e.g., an orchestrator module). An example resource separation protection mechanism is CPU core affinity.

A resource monitor protection mechanism may be configured to divide a vehicle system resource between workloads, and monitor the usage of the vehicle system resource by each workload. If an orchestration module, for example, detects that a workload is using more than intended (e.g., resource usage above a resource usage threshold specified for the workload in a workload descriptor), the monitor may detect and stop usage of the shared vehicle system resource by the violator.

In some example embodiments, the resource monitor may be configured to detect resource usage approaching a threshold limit, and restrict a violator workload prior to usage of the resource exceeding a threshold limit. In a resource monitor protection mechanism, an orchestrator module, for example, may be configured to constantly monitor usage of vehicle system resources by different workload processes. If one of the workloads violates a resource usage threshold, the orchestrator module may be configured to restrict the violating workload, possibly by shutting it down. An example of a resource monitoring protection mechanism includes a GPU execution time that is monitored externally.

Another example resource protection mechanism includes resource management. In this approach, workloads may not be allowed to directly access vehicle system resources. Instead, a workload may be required to request access to the resource from a manager entity (such as the orchestrator module or another suitable control module.

In the resource management protection mechanism, a software entity (such as a workload) may be an owner of the entire vehicle system resource, and resource sharing may be performed by another workload requesting the owner of a resource to perform an operation on the resource. In the resource management protection mechanism, a resource manager may be responsible for allowing or denying access to usage of the resource. An example of a resource management protection mechanism is a vehicle camera resource manager.

In various implementations, such as the resource monitor protection mechanism and the resource management protection mechanism, safety rated workloads may be assigned higher prioritized access than non-safety rated workloads. For example, if a resource conflict occurs or is detected, a workload having a critical safety level may be assigned priority to use the resource over another workload having a non-critical safety level.

Referring to FIG. 5, at 504 the vehicle control module is configured to determine a resource management protection mechanism. At 508, the vehicle control module determines whether resource separation has been specified. If so, control proceeds to 512 to divide vehicle system resources between workloads. The vehicle control module then executes the workloads using the assigned resources at 516.

If the vehicle control module determines at 508 that resource separation has not been specified, control proceeds to 520 to determine whether resource management has been specified. If so, the vehicle control module is configured to monitor resource usage for each workload at 524.

At 528, the vehicle control module determines whether any workloads are exceeding a limit of allowed resource usage. If not, control returns to 524 to continue monitoring resource usage for each workload. If the vehicle control module determines at 528 that a workload is exceeding a usage limit, control proceeds to 532 to restrict resource usage for the violator workload.

If the vehicle control module determines at 520 that resource management has not been specified, control proceeds to 536 to inhibit direct resource access via a resource management protection mechanism. At 540, the vehicle control module is configured to determine whether a resource usage request has been received. If not, control returns to 540 to listen for a resource usage request.

If the vehicle control module determines at 544 that a resource usage request has been received, control proceeds to 548 to check resource and workload permissions. If access is permitted and resources are available at 522, the vehicle control module is configured to allow access to the vehicle system resource by the requesting workload at 556. If access is not permitted at 522, the vehicle control module is configured to deny access to the resource by the requesting workload at 560.

Figure 6:
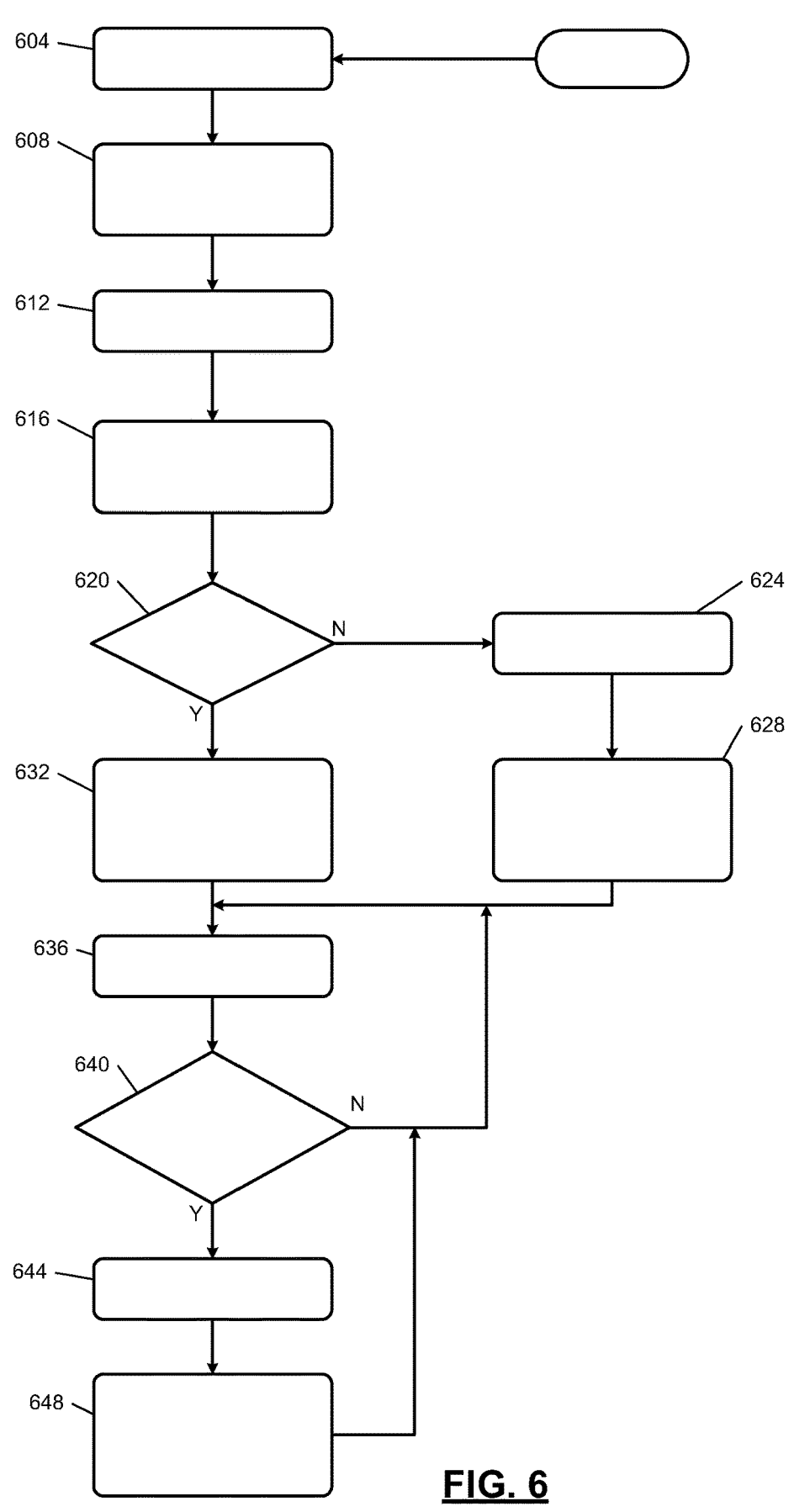
FIG. 6 is a flowchart illustrating an example process for executing a set of workloads including containerized images for safety critical and non-safety critical vehicle control processes.

FIG. 6 is a flowchart illustrating an example process for executing a set of workloads including containerized images for safety critical and non-safety critical vehicle control processes. In some example embodiments, a defined set of workloads for running on an embedded system may be referred as a "workload set". A system orchestrator module (e.g., a software component including a process or set of processes), may run on the embedded system and be responsible for correct execution of the workload set.

The system orchestrator module may be configured in a distributed manner, including a local orchestration process or set of processes, governed by a top-level orchestrator. The system orchestrator module may be configured to receive a workload set, and ensure that each workload in the workload set is properly loaded. For example, for each workload descriptor in the workload set, each containerized image may be loaded either at a defined location (if a defined location exists in the workload descriptor), or at a location where required resources are available.

The system orchestrator module may be configured to monitor the resources use by each workload. Local orchestrators may be configured to receive resource usage statistics from various sources, such as the operating system, Oracle Enterprise Manager monitoring modules, and/or other modules. When resource usage statistics show that one of the containerized images consumes more than an amount of resource usage defined in the descriptor, the system orchestrator module may look at a recovery mechanism definition for the containerized image. Based on the recovery mechanism definition, the system orchestrator module may automatically "recover" the workload by unloading and reloading it.

Referring to FIG. 6, the vehicle control module is configured to receive a workload set at 604. The vehicle control module then validates a proper loading of the workload set at 608. At 612, the vehicle control module is configured to select the workloads in the set.

At 616, the vehicle control module is configured to determine whether the workload descriptors specify load locations. If loading locations are specified at 620, the vehicle control module is configured to load each containerized image of the workload at a defined location, at 632. If loading locations are not specified, the vehicle control module is configured to identify available resource locations at 624, and load each containerized image of the workload at an available location, at 628.

At 636, the vehicle control module is configured to monitor resource usage by each workload. If no workloads are exceeding resource usage at 640, control returns to 636 to continue monitoring resource usage. If a workload resource usage exceeds a threshold usage amount specified in a workload descriptor at 640, the vehicle control module is configured to identify a recovery mechanism at 644. Control then automatically recovers the workload by unloading and reloading the workload, at 648.

Figure 7:
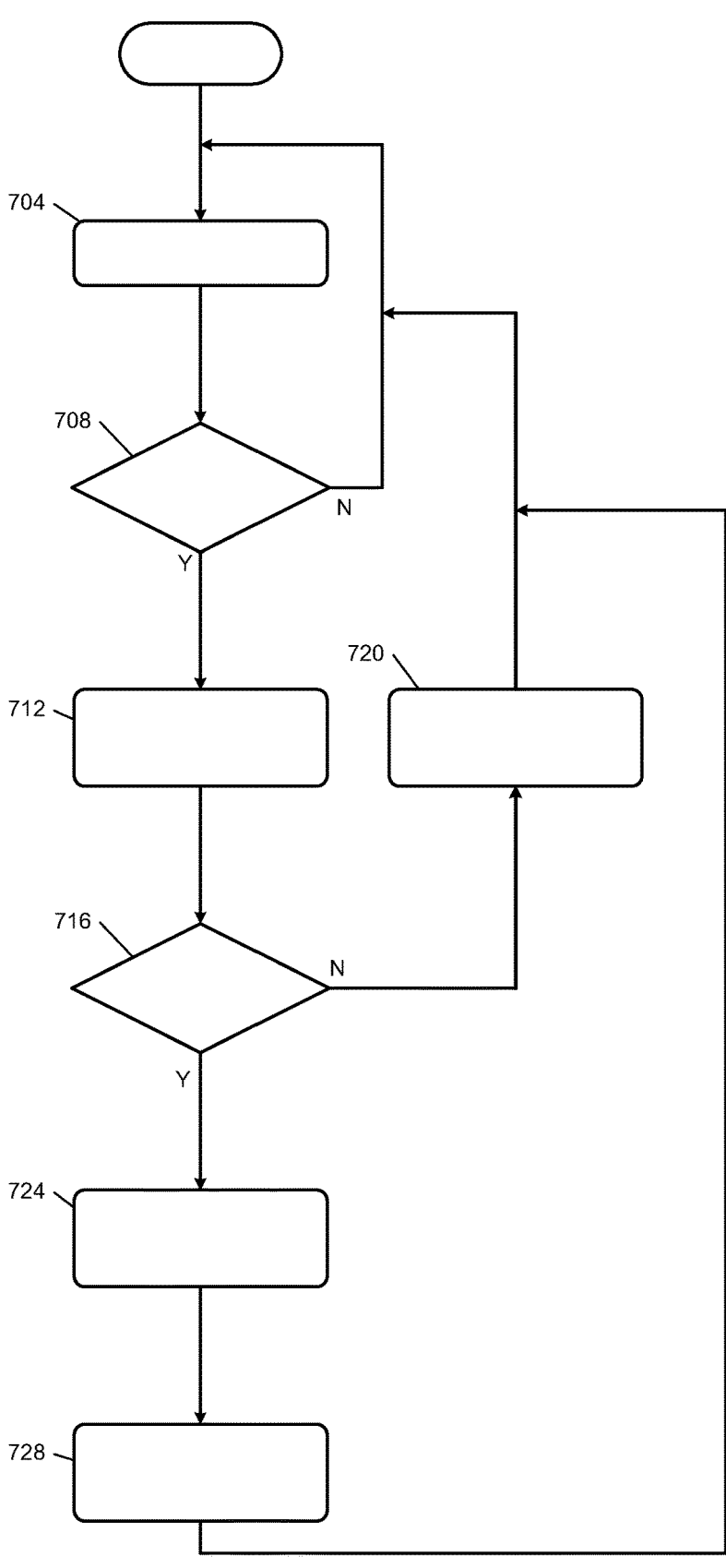
FIG. 7 is a flowchart illustrating an example process for recovering a workload in response to an error.

FIG. 7 is a flowchart illustrating an example process for recovering a workload in response to an error. In some example embodiments, if an errors or unexpected behavior occurs at one of the workloads, the vehicle control module may desire to recover the workload, in order to resume normal operation. For example, as the vehicle system resources are protected, the vehicle control module may be able to perform a shutdown or restart of workloads without interference to other workloads.

In various implementations, restarting of a workload may be performed automatically by a system orchestrator module. For example, automatic restart may be allowed for non-safety critical rated workloads. In other examples, the vehicle control module may perform an automatic shutdown, followed by a managed restart. For example, safety critical rated workloads may require restarting actions that have safety implications, and a restart of safety critical rated workloads may be performed by another software entity.

Referring to FIG. 7, the vehicle control module is configured to monitor for a workload error at 704. The vehicle control module then determines whether a workload error has occurred at 708. If not, control returns to 704 to continue monitoring for workload errors.

If control determines at 708 that a workload error has occurred, control proceeds to 712 to determine a safety rating of an error workload. If the workload is a non-safety critical workload at 716, control proceeds to 720 to automatically restart the workload via the system orchestrator module. If the workload is determined to be a safety critical rated workload at 716, control proceeds to 724 to automatically shut down the workload experiencing the error. The vehicle control module is then configured to request a managed restart of the shutdown workload at 728.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A vehicle control method comprising:

defining a set of multiple workloads, each workload including a workload descriptor and at least one containerized image configured to execute at least one vehicle control process, the workload descriptor defining a safety level of the workload, a recovery mechanism for the workload, one or more vehicle system resources used by the at least one containerized image of the workload, and a vehicle system location for executing the containerized images of the workload;

allocating vehicle system resources to each workload according to the workload descriptors, wherein the vehicle system resources include at least one of a central processor utilization, a graphics processor utilization, a memory size, an artificial intelligence accelerator, or a video codec;

executing the vehicle control processes of the containerized images of the multiple workloads;

in response to a vehicle system resource conflict, assigning higher priority resource access to workloads having a critical safety level and assigning lower priority resource access to workloads having a non-critical safety level;

monitoring operation of each workload for an error condition; and in response to detecting the error condition for one of the multiple workloads:

17 determining the safety level of the one of the multiple workloads having the error condition:

automatically shutting down one or more vehicle control processes of the one of the multiple workloads having the error condition, in response to the safety level being a non-critical safety level; and requesting a managed shutdown of the one or more vehicle control processes of the one of the multiple workloads having the error condition in response to the safety level being a critical safety level.

2. The method of claim 1, further comprising:

assigning a first one of the vehicle system resources to a first one of the multiple workloads; and assigning a second one of the vehicle system resources to a second one of the multiple workloads, wherein the second one of the multiple workloads is inhibited from accessing the first one of the vehicle system resources.

3. The method of claim 1, further comprising:

monitoring resource usage of each workload;

comparing the monitored resource usage of each workload to a threshold resource usage value associated with the workload; and in response to the monitored resource usage of one of the multiple workloads exceeding the threshold resource usage value associated with the workload, restricting the workload from accessing at least one of the vehicle system resources.

4. The method of claim 3, wherein:

monitoring resource usage of each workload is performed by an orchestrator module or a separate monitor module used by the orchestrator module; and the orchestrator module is configured to load the workload descriptor of each of the multiple workloads to determine the threshold resource usage value associated with each workload.

5. The method of claim 1, further comprising:

inhibiting access to a vehicle system resource by the multiple workloads;

receiving a request from one of the multiple workloads to access the vehicle system resource;

comparing the one of the one of the multiple workloads to a resource permission list;

allowing the one of the multiple workloads to utilize the vehicle system resource in response an indication in the resource permission list that the one of the multiple workloads is permitted to utilize the vehicle system resource; and denying the one of the multiple workloads from utilizing the vehicle system resource in response an indication in the resource permission list that the one of the multiple workloads is not permitted to utilize the vehicle system resource.

6. The method of claim 1, wherein each containerized image is configured to execute as at least one of a file, a binary format or a memory buffer.

7. The method of claim 6, wherein each containerized image includes a configuration file configured to specify an order of loading and unloading each process component associated with the containerized image.

8. The method of claim 1, further comprising:

in response to the safety level being a non-critical safety level, automatically restarting the one or more vehicle control processes of the one of the multiple workloads having the error condition; and

18 in response to the safety level being a critical safety level, requesting a managed restart of the one or more vehicle control processes of the one of the multiple workloads having the error condition.

9. The method of claim 1, further comprising:

receiving, by an orchestrator module, the set of multiple workloads; and for each containerized image in the set of multiple workloads:

loading the containerized image at a defined location when the workload descriptor associated with the containerized image specifies a loading location for the containerized image; and when the workload descriptor associated with the containerized image does not specify a loading location for the containerized image, identifying a system resource location where vehicle system resources are available and loading the containerized image at the system resource location.

10. The method of claim 1, wherein:

one of the multiple workloads is an autonomous driving workload; and each vehicle control process associated with a containerized image of the autonomous driving workload is configured to control at least one autonomous driving feature of a vehicle.

11. The method of claim 1, wherein:

at least one of the multiple workloads has a critical safety level and includes a vehicle braking control process; and at least one of the multiple workloads has a non-critical safety level and includes at least one of an infotainment system control process or a heating, air-conditioning and ventilation (HVAC) system control process.

12. The method of claim 1, wherein at least one of the multiple workloads includes two containerized images that are configured to execute on different operating systems.

13. The method of claim 12, wherein a hypervisor module is configured to control operation of the different operating systems via a same system-on-chip implementation.

14. A vehicle control system comprising:

a motor configured to drive wheels of a vehicle;

a braking module configured to inhibit rotation of the wheels of the vehicle; and a vehicle control module configured to:

define a set of multiple workloads, each workload including a workload descriptor and at least one containerized image configured to execute a vehicle control process, the workload descriptor defining a safety level of the workload, a recovery mechanism for the workload, one or more vehicle system resources used by the at least one containerized image of the workload, and a vehicle system location for executing the vehicle control process of the containerized image of the workload;

allocate vehicle system resources to each workload according to the workload descriptors, wherein the vehicle system resources include at least one of a central processor utilization, a graphics processor utilization, a memory size, an artificial intelligence accelerator, or a video codec;

execute the vehicle control processes of the containerized images of the multiple workloads;

in response to a vehicle system resource conflict, assign higher priority resource access to workloads having a critical safety level and assign lower priority resource access to workloads having a non-critical safety level;

monitor operation of each workload for an error condition; and in response to detecting the error condition for one of the multiple workloads:

determine the safety level of the one of the multiple workloads having the error condition;

automatically shut down one or more vehicle control processes of the one of the multiple workloads having the error condition, in response to the safety level being a non-critical safety level; and request a managed shutdown of the one or more vehicle control processes of the one of the multiple workloads having the error condition in response to the safety level being a critical safety level.

15. The vehicle control system of claim 14, wherein the vehicle control module is configured to:

assign a first one of the vehicle system resources to a first one of the multiple workloads; and assign a second one of the vehicle system resources to a second one of the multiple workloads, wherein the second one of the multiple workloads is inhibited from accessing the first one of the vehicle system resources.

16. The vehicle control system of claim 14, wherein the vehicle control module is configured to:

monitor resource usage of each workload;

compare the monitored resource usage of each workload to a threshold resource usage value associated with the workload; and in response to the monitored resource usage of one of the multiple workloads exceeding the threshold resource usage value associated with the workload, restricting the workload from accessing at least one of the vehicle system resources.

17. The vehicle control system of claim 16, further comprising an orchestrator module configured to:

monitor usage of each workload; and load the workload descriptor of each of the multiple workloads to determine the threshold resource usage value associated with each workload.

18. The vehicle control system of claim 14, wherein the vehicle control module is configured to:

inhibit access to at least one of the vehicle system resources by the multiple workloads;

receive a request from one of the multiple workloads to access the at least one of the vehicle system resources;

compare the one of the one of the multiple workloads to a resource permission list;

allow the one of the multiple workloads to utilize the at least one of the vehicle system resources in response an indication in the resource permission list that the one of the multiple workloads is permitted to utilize the at least one of the vehicle system resources; and deny the one of the multiple workloads from utilizing the at least one of the vehicle system resources in response an indication in the resource permission list that the one of the multiple workloads is not permitted to utilize the at least one of the vehicle system resources.

19. The vehicle control system of claim 14, wherein each containerized image is configured to execute as at least one of a file, a binary format or a memory buffer.

20. A vehicle control method comprising:

defining a set of multiple workloads, each workload including a workload descriptor and at least one containerized image configured to execute at least one vehicle control process, the workload descriptor defining a safety level of the workload, a recovery mechanism for the workload, one or more vehicle system resources used by the at least one containerized image of the workload, and a vehicle system location for executing the containerized images of the workload;

allocating vehicle system resources to each workload according to the workload descriptors;

executing the vehicle control processes of the containerized images of the multiple workloads;

in response to a vehicle system resource conflict, assigning higher priority resource access to workloads having a critical safety level and assigning lower priority resource access to workloads having a non-critical safety level;

monitoring operation of each workload for an error condition; and in response to detecting the error condition for one of the multiple workloads:

determining the safety level of the one of the multiple workloads having the error condition;

automatically shutting down one or more vehicle control processes of the one of the multiple workloads having the error condition, in response to the safety level being a non-critical safety level; and requesting a managed shutdown of the one or more vehicle control processes of the one of the multiple workloads having the error condition in response to the safety level being a critical safety level.

* * * * *